US006614284B1

(12) United States Patent
Beeman et al.

(10) Patent No.: US 6,614,284 B1
(45) Date of Patent: Sep. 2, 2003

(54) PNP MULTIPLIER

(75) Inventors: Donald St. John Beeman, Penn Valley, CA (US); Jeffrey P. Kotowski, Nevada City, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/011,239

(22) Filed: Nov. 8, 2001

(51) Int. Cl.[7] ............................ G06F 7/64; G06G 7/12
(52) U.S. Cl. ...................................... 327/334; 327/334
(58) Field of Search ................................ 257/100, 335; 326/26, 27, 83; 327/108, 427, 53, 66, 132, 490, 538, 335, 361, 355, 356; 294/8.5

(56) References Cited

U.S. PATENT DOCUMENTS 6,130,549 A * 10/2000 Buck .......................... 326/26
6,181,202 B1 * 1/2001 Yamasaki .................. 330/257
6,291,977 B1 * 9/2001 Iliasevitch ................. 323/315

FOREIGN PATENT DOCUMENTS

JP 06189531 A * 7/1994

OTHER PUBLICATIONS

Adel S. Sedra and Kenneth C. Smith, Microelectronic Circuits 1998, Oxford University Press, Inc., 4th edition, pp 512–514.*

* cited by examiner

*Primary Examiner*—Wael Fahmy
*Assistant Examiner*—Dana Farahani
(74) *Attorney, Agent, or Firm*—Brett A. Hertzberg; Merchant & Gould

(57) ABSTRACT

A method and apparatus are directed to emulating an emitter follower with a small PNP transistor that is arranged in a PNP multiplier configuration. The PNP multiplier includes a PNP emitter follower and a current mirror. The PNP follower is coupled between the input and the output. A current mirror is coupled to the collector of the PNP follower such that mirror produces a current that is a scaled version of the collector current from the PNP follower. The current mirror is arranged to scale the PNP collector current by a factor of N. The effective output current from the PNP multiplier circuit corresponds to $\beta \cdot I_{IN} \cdot (N+1)$, where β corresponds to the large signal forward gain of the PNP follower. By multiplying the output current by a scaling factor, the effective forward gain of the PNP transistor is increased while utilizing a small geometry PNP device.

10 Claims, 8 Drawing Sheets

PNP MULTIPLIER

FIELD OF THE INVENTION

The present invention relates to emitter followers. In particular, the present invention relates to an apparatus and method that has a voltage gain and current gain that are comparable to a PNP emitter follower circuit that employs a PNP transistor with a large die area.

BACKGROUND OF THE INVENTION

An emitter follower is a single transistor circuit that is arranged in a common-collector configuration. The transistor in the emitter follower can be an NPN transistor or a PNP transistor. An emitter follower has a voltage gain from the base of the transistor to the emitter that is close to one. The emitter follower is often used to provide a high current output since the transistor has a high current gain. Additionally, the emitter follower has a high input impedance and a low output impedance. An emitter follower is useful for isolating or buffering a high-resistance source such that a low-resistance load does not excessively load down the source.

SUMMARY OF THE INVENTION

A method and apparatus are directed to emulating an emitter follower with a small PNP transistor that is arranged in a PNP multiplier configuration. The PNP multiplier includes a PNP emitter follower and a current mirror. The PNP follower is coupled between the input and the output. A current mirror is coupled to the collector of the PNP follower such that mirror produces a current that is a scaled version of the collector current from the PNP follower. The current mirror is arranged to scale the PNP collector current by a factor of N. The effective output current from the PNP multiplier circuit corresponds to $\beta \cdot I_{IN} \cdot (N+1)$, where β corresponds to the large signal forward gain of the PNP follower. By multiplying the output current by a scaling factor, the effective forward gain of the PNP transistor is increased while utilizing a small geometry PNP device.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

Figure 1:
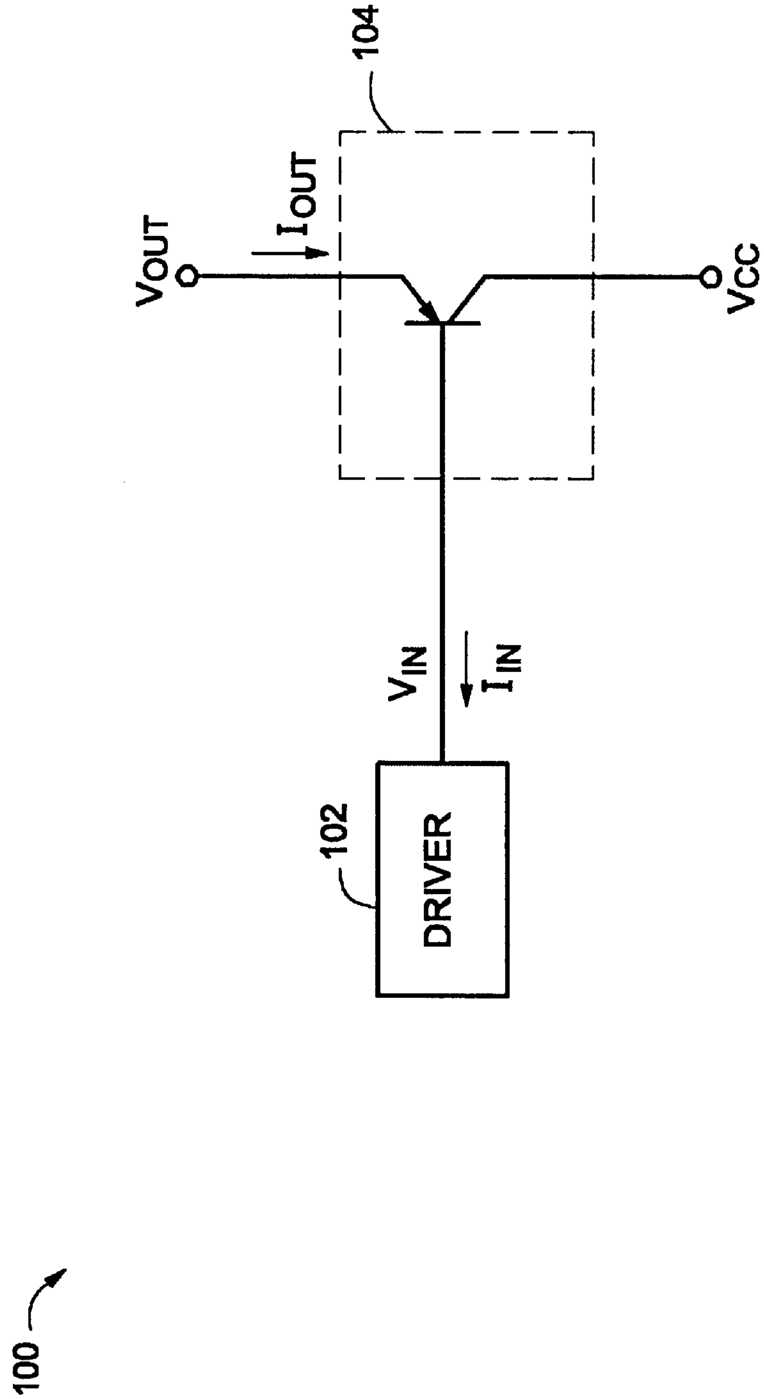
FIG. 1 is a schematic diagram illustrating an exemplary operating environment for a PNP multiplier circuit.

FIG. 1 is a schematic diagram illustrating an operating environment (100) for the present invention. An exemplary environment (100) of the present invention includes a driver circuit (102), a PNP multiplier (104), voltage source VCC, and an output port (VOUT). Driver circuit 102 has an output that is coupled to an input of PNP multiplier 102. PNP multiplier 102 is also coupled to voltage source VCC and output port VOUT. PNP multiplier 102 operates as an emitter follower circuit.

The present invention utilizes an arrangement of transistors that operate similar to an emitter follower circuit. The sizes of the transistor devices used to achieve the emitter follower are small (i.e., die area) while providing an appropriately high current gain. The apparatus includes a small PNP emitter follower that is coupled to a current mirror. The ratio of the current mirror determines the current gain of the apparatus. The apparatus gives comparable performance to a large PNP transistor, without the large die area required by a conventional emitter follower.

Figure 2:
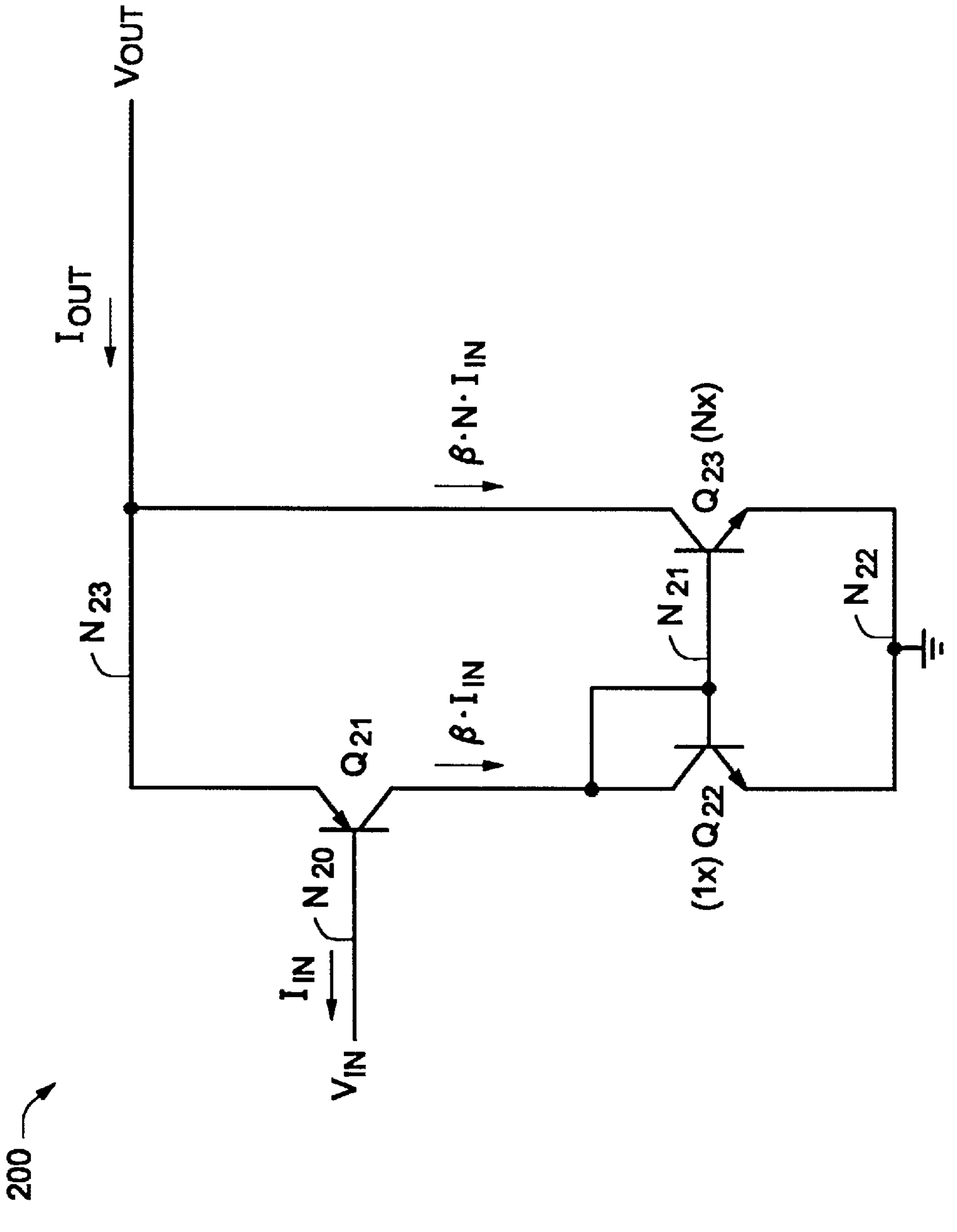
FIG. 2 is a schematic diagram of a first example PNP multiplier.

FIG. 2 shows a PNP multiplier circuit (200) that is in accordance with the present invention. As shown in the FIGURE, PNP multiplier 200 includes a PNP transistor (Q21) and two NPN transistors (Q22–Q23). Transistor Q21 has a base that is coupled to node N20, an emitter that is coupled to node N23, and a collector that is coupled to node N21. Transistor Q22 is a diode-connected device that has a base and a collector that are coupled to node N21, and an emitter that is coupled to node N22. Transistor Q23 has a base that is coupled to node N21, an emitter that is coupled to node N22, and a collector that is coupled to node N23. Node N22 is connected to ground terminal (GND).

Transistor Q21 is a PNP emitter follower that has an emitter that provides an output voltage ($V_{OUT}$) in response to the input voltage ($V_{IN}$) that is supplied to the base. An input current ($I_{IN}$) is drawn from the base of transistor Q21 as indicated on the figure. Transistor Q21 has an associated forward gain (β). The collector current of transistor Q21 is determined by $\beta \cdot I_{IN}$. Transistors Q22 and Q23 are configured to operate as a current mirror with a 1:N ratio. Transistor Q23 has a collector current that is determined by $\beta \cdot N \cdot I_{IN}$. The output current ($I_{OUT}$) corresp-onds to the sum of the collector current for transistor Q23 and the emitter current for transistor Q21. Neglecting base currents for transistors Q22 and Q23, the collector current ($I_{OUT}$) of transistors Q21 and Q23 are determined by $\beta \cdot I_{IN} \cdot (N+1)$. The total effective current gain for the PNP multiplier (200) is thus given by $\beta \cdot (N+1)$.

The PNP multiplier (200) is arranged to act as the equivalent of a large PNP device with a relatively high current gain characteristic. PNP multiplier 200 provides a current gain of $\beta \cdot (N+1)$ at low frequencies as will be discussed in further detail. The value of N is chosen according to the desired current gain for the PNP multiplier circuit (200). By scaling the ratio of the current mirror, the current gain can be scaled by the factor N. A small PNP transistor (Q21) may be used such that die area is conserved. The gain of the transistor Q21 is increased by the multiplication factor (N) created by the current mirror.

Although the diagram shows a 1:N current mirror, other embodiments are possible. For example, a current mirror could be coupled to transistor Q21 via a cascode arrangement. This would improve the performance of the circuit at higher voltages. At higher voltages, the Early effect may cause the current at the collector of transistor Q23 to be significantly less than $\beta \cdot N \cdot I_{IN}$. The cascode arrangement prevents the mismatch in the current scaling that would otherwise result from the Early effect.

Figure 3:
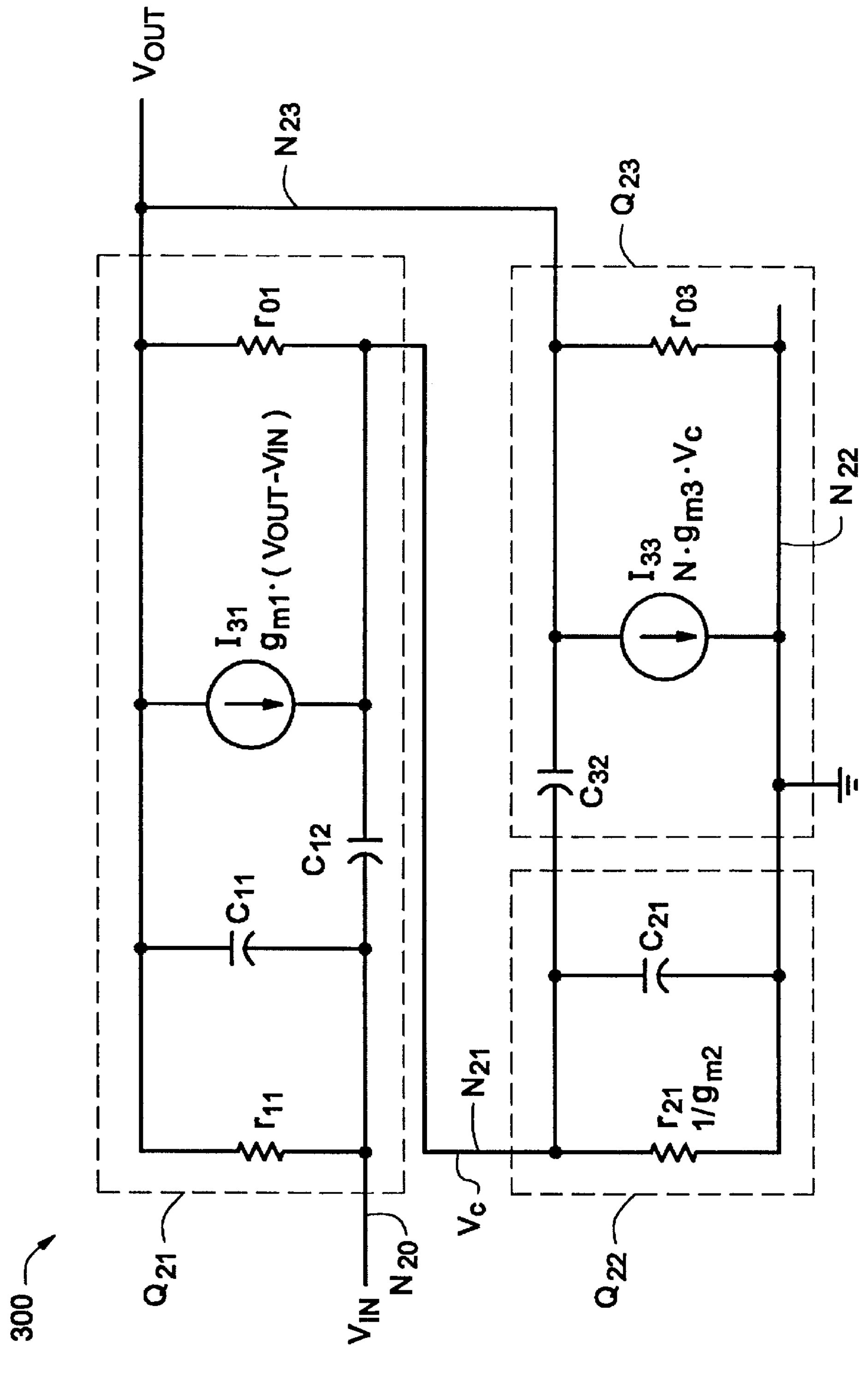
FIG. 3 is a small signal model of the PNP multiplier illustrated in FIG. 2.

FIG. 3 is a schematic diagram of a small signal model (300) that corresponds to the PNP multiplier (200) shown in FIG. 2. The small signal model (300) includes equivalent circuits for transistors Q21, Q22, and Q23. The equivalent circuit for transistor Q21 includes two resistors (r11, ro1), a controlled current source 131, and two capacitors (C11, C12). The equivalent circuit for transistor Q22 includes a resistor (r21) and a capacitor (C21). The equivalent circuit for transistor Q23 includes a capacitor (C32) a controlled current source (133), and a resistor (ro3).

Resistor r11 is coupled between node N20 and node N23. Capacitor C11 is coupled between node N20 and node N23. Controlled current source 131 is coupled between node N23 and node N21. Resistor ro1 is coupled between node N23 and node N21. Capacitor C12 is coupled between node N20 and node N21. Resistor r21 is coupled between node N21 and node N22. Capacitor C21 is coupled between node N21 and node N22. Capacitor C32 is coupled between node N21 and node N23. Controlled current source 133 is coupled between node N22 and node N23. Resistor ro3 is coupled between node N22 and node N23.

An output voltage appears at node N23 in response to an input voltage ($V_{IN}$) that is applied to node N20 during operation. An intermediary voltage ($V_C$) is produced at node N21. Controlled current source 131 provides a current that is determined by $gm_1 \cdot (V_{OUT} - V_{IN})$, where gm1 corresponds to the transconductance of transistor Q21. Resistor r21 has a resistance that corresponds to $1/gm_2$, where $gm_2$ corresponds to the transconductance of transistor Q22. Controlled current source 133 provides a current that corresponds to $N \cdot gm3 \cdot V_C$.

Figure 4:
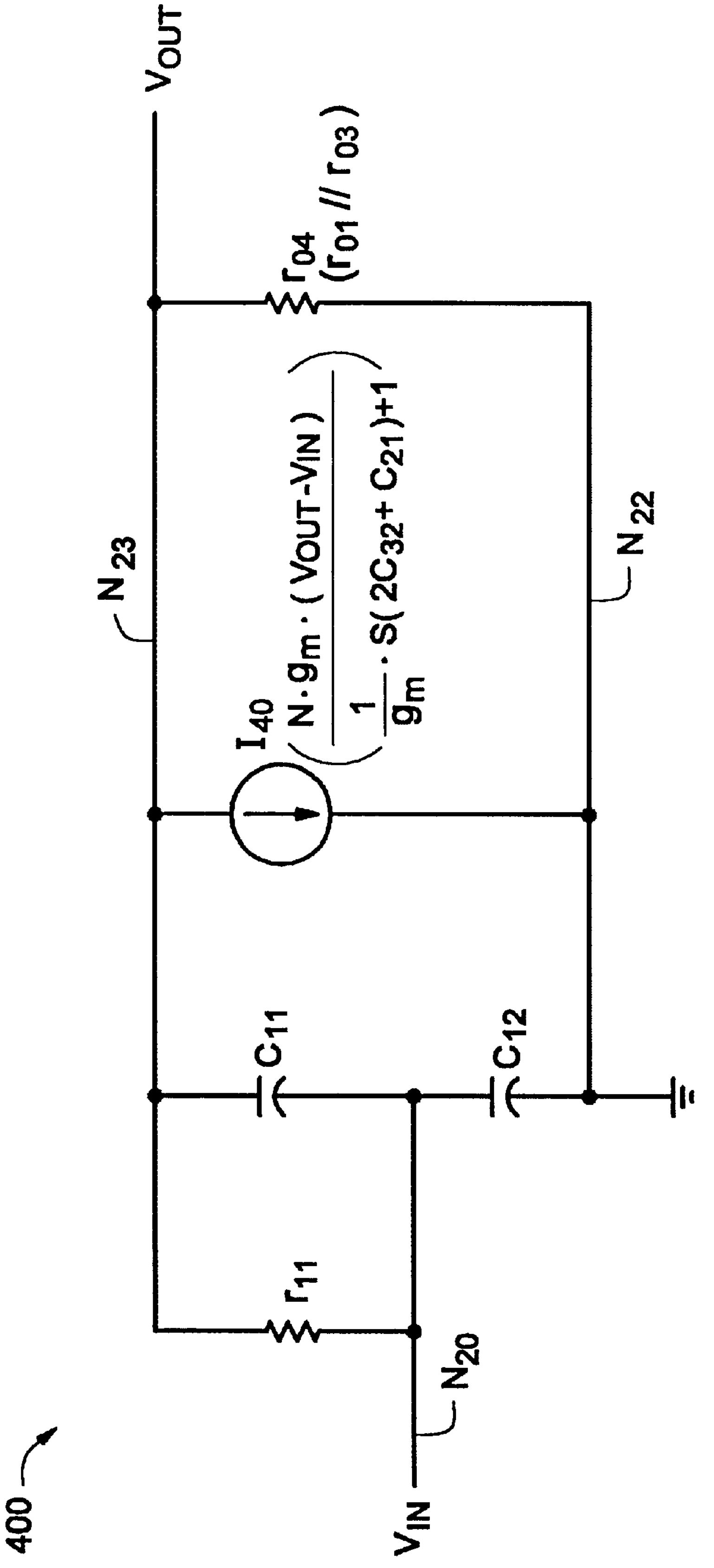
FIG. 4 is a simplified small signal model of the PNP multiplier illustrated in FIG. 2.

FIG. 4 shows a schematic diagram (400) that corresponds to a simplified small signal model 400 for small signal model 300. Simplified small signal model 400 includes resistor r11, capacitor C11, capacitor C12, controlled current source 140, and resistor ro4. Resistor r11 is coupled between node N20 and node N23. Capacitor C11 is coupled between node N20 and node N23. Capacitor C12 is coupled between node N22 and node N20. Current source 140 is coupled between node N23 and node N22. Resistor ro4 is coupled between node N23 and node N22.

Resistor ro4 has a value that corresponds to the parallel combination of ro1 and ro3. Controlled current source 140 provides a current that is determined by:

$$140 = \frac{N \cdot gm \cdot (V_{OUT} - V_{IN})}{\frac{1}{gm} \cdot s \cdot ((2 \cdot C_{32}) + C_{21}) + 1},$$

where $gm = gm_1 = gm_2 = gm_3$.

The above illustrated small signal model results in a pole at a frequency that corresponds to $$\frac{gm}{(2 \cdot C_{32}) + C_{21}}$$

Since capacitors C21 and C32 are normally very small, the pole is at a high frequency. The pole will cause PNP multiplier 200 to act differently than a conventional PNP circuit at high frequencies. Specifically, PNP multiplier 200 will have a lower current gain and a lower phase margin than a conventional PNP emitter follower at high frequencies. However, at lower frequencies, PNP multiplier 200 will behave the same as a PNP emitter follower with a large die area.

As previously stated, the ratio (N) that is provided by the current mirror as determined by transistors Q22 and Q23. The ratio may be achieved by scaling the area of the transistors, by providing a parallel combination of transistors, or any combination of area scaled and paralleled transistors. For example, a scaling factor (N) of twenty can be achieved by arranging twenty-one identically sized transistors. In this instance, twenty of the transistors are connected in parallel to provide Q23, while one transistor is configured as diode connected transistor Q22.

Although the previous illustrations have a simple two transistor current mirror, other arrangements may replace transistors Q22 and Q23 and provide the same functionality in the PNP multiplier. FIGS. 5–8 illustrate exemplary alternative current mirrors.

Figure 5:
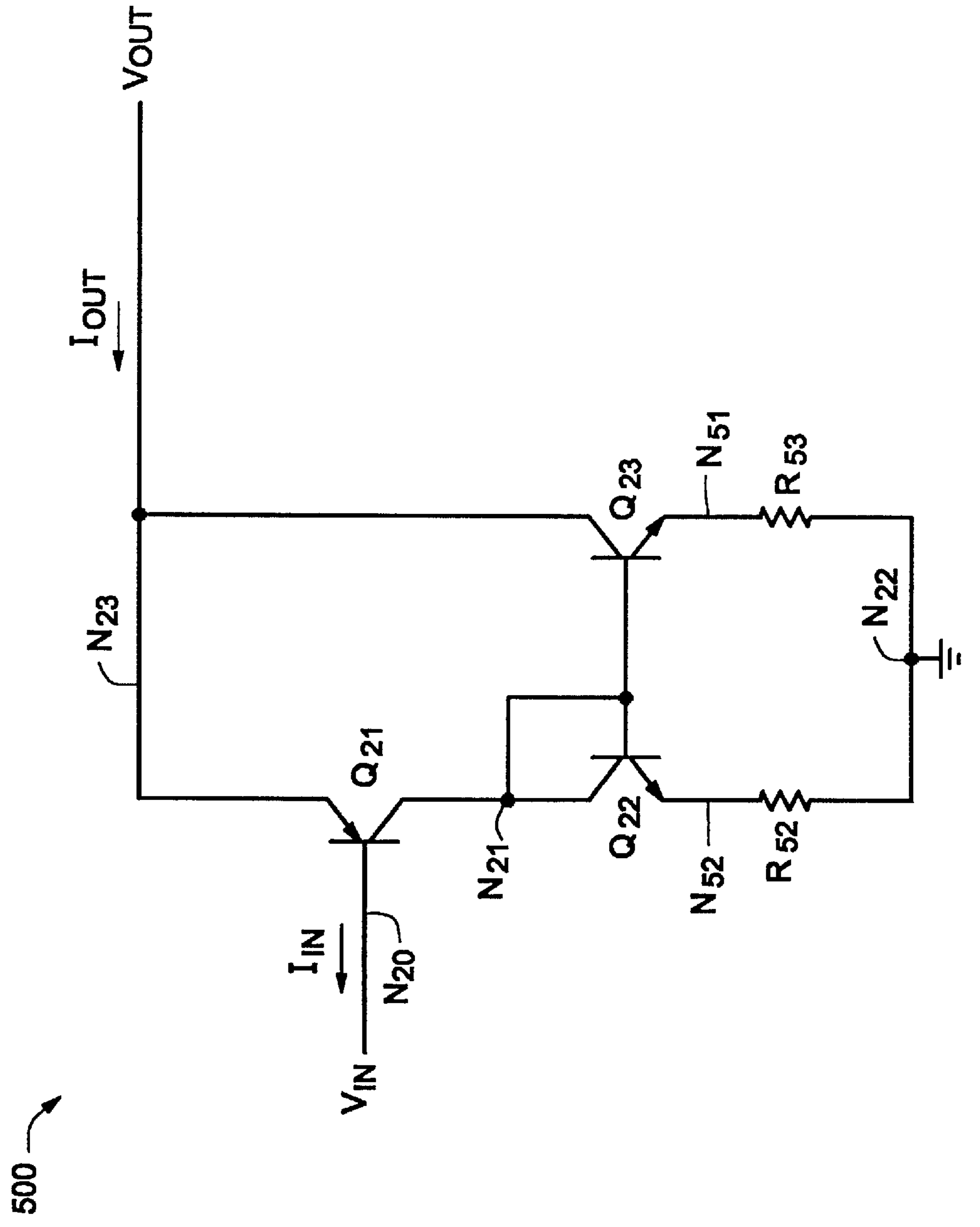
FIG. 5 is a schematic diagram of another PNP multiplier.

FIG. 5 illustrates a PNP multiplier that employs an emitter degenerated current mirror. The arrangement is substantially similar to the current mirror described in FIG. 2 with the addition of resistors R52 and R53, which are coupled between ground (GND) and the emitters of transistors Q22 and Q23 respectively. The operation of the current mirror yields a similar result to that previously provided, while also increasing the output impedance of the current mirror.

Figure 6:
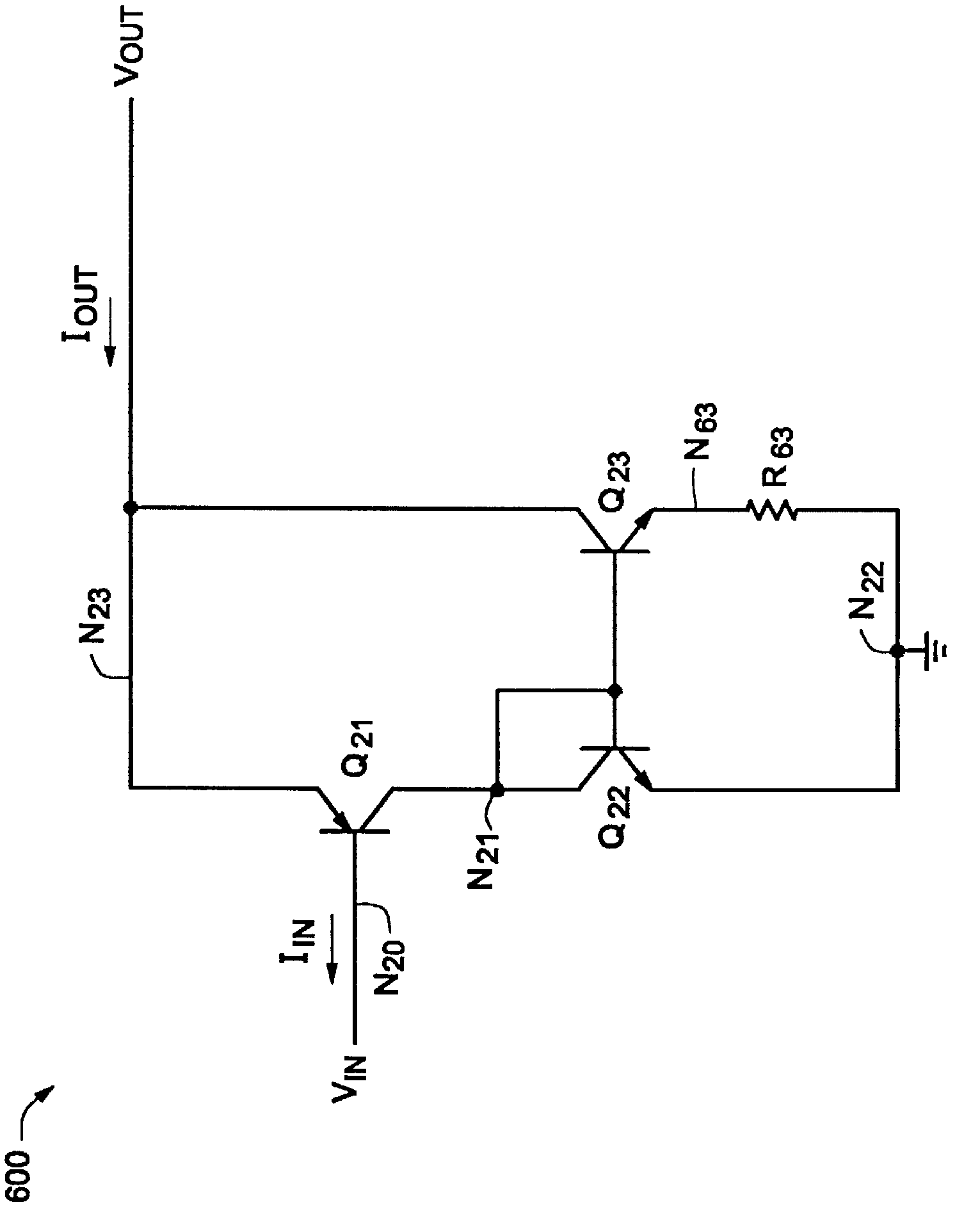
FIG. 6 is a schematic diagram of still another PNP multiplier.

FIG. 6 illustrates a PNP multiplier that employs a Widlar current mirror. The arrangement is substantially similar to the current mirror described in FIG. 2 with the addition of a resistor R63, which are coupled between ground (GND) and the emitter of transistor Q23. The operation of the current mirror yields a similar result to that previously provided, while also increasing the output impedance of the current mirror.

Figure 7:
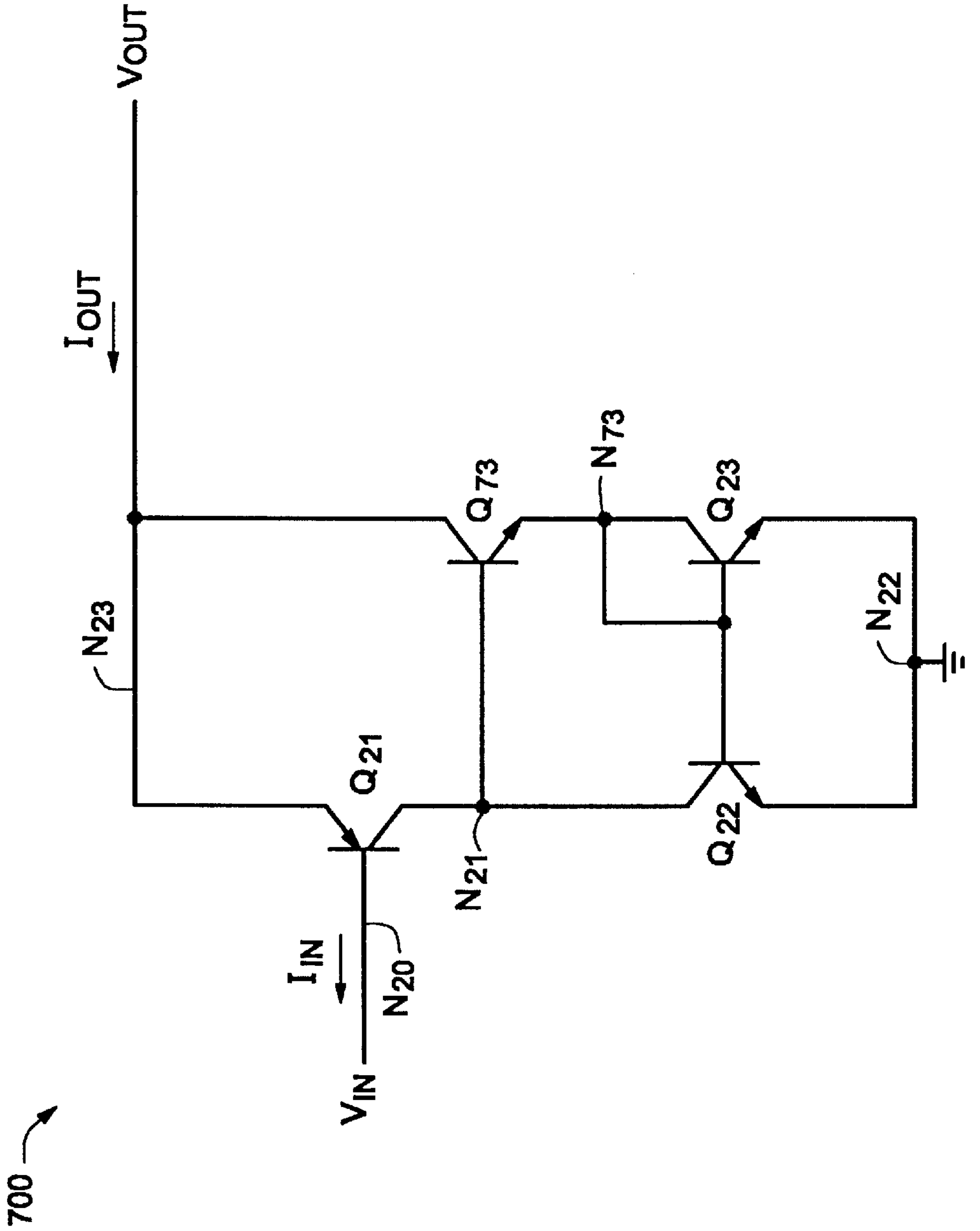
FIG. 7 is a schematic diagram of yet another PNP multiplier.

FIG. 7 illustrates a PNP multiplier that employs a Wilson current mirror. The arrangement is substantially similar to the current mirror described in FIG. 2 with the addition of transistor Q73. However, in FIG. 7, transistor Q22 is not diode connected, while transistor Q23 is diode connected (collector and base coupled together at node N73). Transistor Q73 is an NPN transistor that is arranged as a cascode transistor that is series connected between the output at node N23 and the collector of Q23 at node N24. Transistor Q73 has a base that is coupled to node N21, a collector that is connected to node N23, and an emitter that is connected to node N73. The operation of the current mirror yields a similar result to that previously provided, while also increasing the output impedance of the current mirror.

Figure 8:
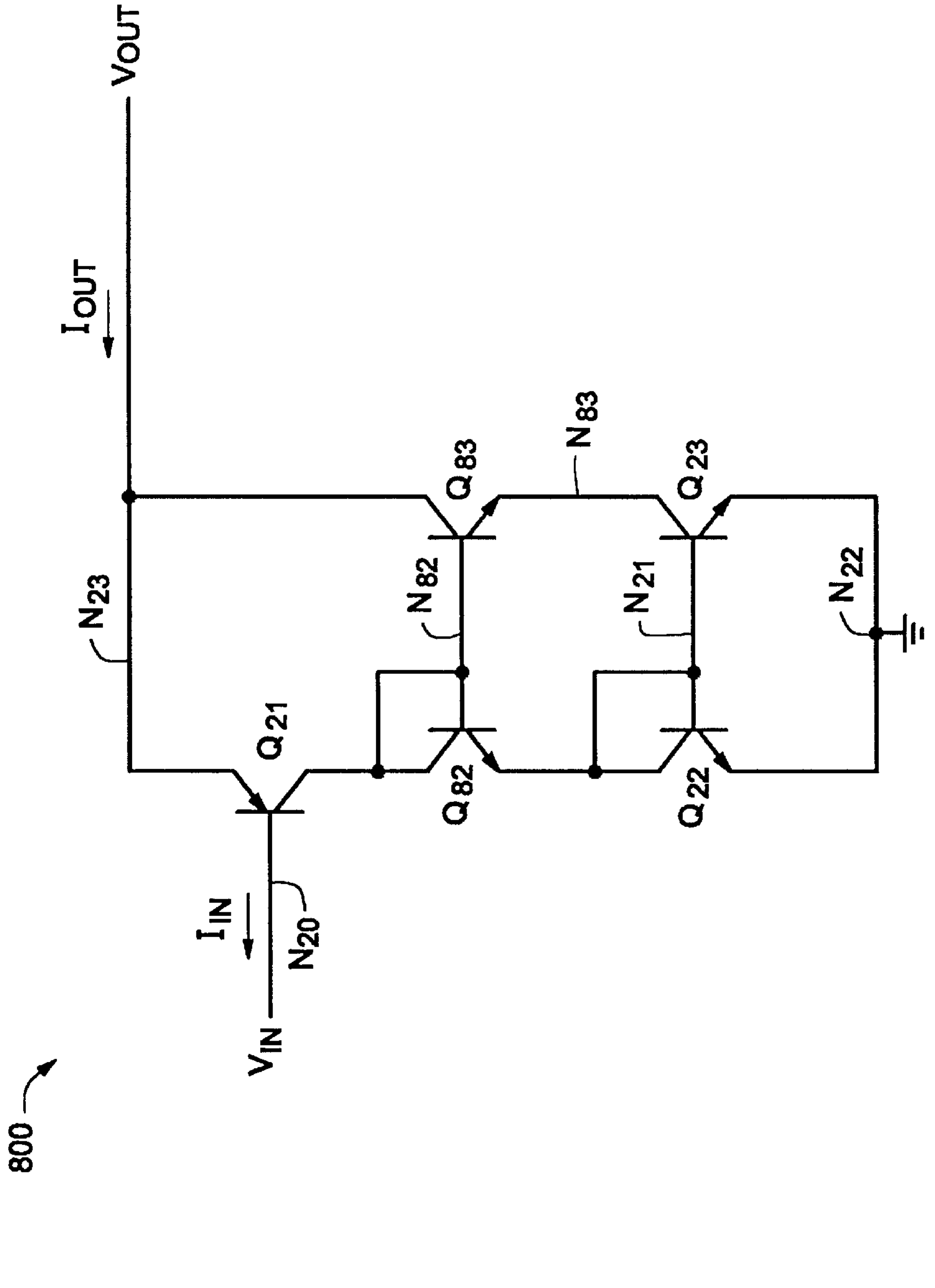
FIG. 8 is a schematic diagram of still yet another PNP multiplier, in accordance with the present invention.

FIG. 8 illustrates a PNP multiplier that employs a cascode current mirror. The arrangement is substantially similar to the current mirror described in FIG. 2 with the addition of transistors Q82 and Q83. Transistor Q82 is a diode connected NPN device that is connected in series between transistors Q21 and Q22. Transistor Q83 is an NPN device that is connected in series between the output and transistor Q23. The collector and base of transistor Q82 are connected to the collector of transistor Q21 at node N82, while the emitter of transistor Q82 is connected to node N21. The collector of transistor Q83 is connected to the output at node N23. The base of transistor Q83 is connected to node N82, while the emitter is connected to the collector of transistor Q23 at node N83. The operation of the current mirror yields a similar result to that previously provided, while also increasing the output impedance of the current mirror.

Although the preceding description describes various embodiments of the system, the invention is not limited to such embodiments, but rather covers all modifications, alternatives, and equivalents that fall within the spirit and scope of the invention. Since many embodiments of the invention can be made without departing from the spirit and scope of the invention, the invention resides in the claims hereinafter appended.

We claim:

1. An apparatus comprising:

a first bipolar junction transistor that has a base that is configured to receive an input signal, and an emitter that is coupled to an output node, wherein the emitter is arranged to provide an output signal at the output node; and a current mirror having an input port and an output port, wherein the output port is directly coupled to the output node and the input port is coupled to the collector of the first bipolar junction transistor, and the current mirror arranged to provide a current output to the output node that corresponds to a multiplication of the collector current from the first bipolar junction transistor by a scaling factor (N), whereby the apparatus emulates the function of an emitter follower such that the first bipolar junction transistor is reduced in size.

2. The apparatus of claim 1, wherein the first transistor has a large signal forward gain (β) associated with the collector, and the current mirror provides a current output (β·N) such that a total current delivered to the output node by the apparatus is determined by β·(N+1).

3. The apparatus of claim 1, wherein the bipolar junction transistor is a PNP transistor.

4. The apparatus of claim 1, wherein the current mirror is at least one of an emitter degenerated current mirror, a Widlar current mirror, a Wilson current mirror, and a cascode current mirror.

5. The apparatus of claim 1, the current mirror further comprising a second transistor and a third transistor that are arranged to operate as a current mirror.

6. The apparatus of claim 5, wherein the base and collector of the second transistor are coupled to the base of the third transistor, the collector of the first transistor is coupled to the collector of the second transistor, and the collector of the third transistor is coupled to the emitter of the first transistor.

7. The apparatus of claim 6, wherein an area associated with the second transistor is related to another area associated with the third transistor by the scaling factor (N).

8. The apparatus of claim 6, wherein the third transistor comprises a multiplicity of transistors that are arranged in parallel with one another such that the third transistor mirrors a current that is related to a current in the second transistor by the scaling factor (N).

9. An apparatus comprising:

a means for following that is directly coupled to an output node, wherein the means for following is arranged to produce an output signal at the output node in response to an input signal, wherein the means for following conducts a current that is related to the input signal by a forward gain parameter (β);

a means for sensing that is arranged to sense the current from the means for following; and a means for reflecting having an input port and an output port, wherein the output port is coupled to the output node, the input port is coupled to the means for sensing, and the means for reflecting is arranged to provide another current at the output node in response to the current, wherein the another current is related to the current by a scaling factor (N), wherein the current and the another current are combined to provide an output current that is substantially related to the input signal by β·(N+1).

10. A method for buffering an input voltage and providing an output current in response to an input signal comprising:

producing a first signal at an output node, wherein the first signal is related to the input signal by a forward gain factor (β);

sensing the first signal; and scaling the first signal by a scaling factor (N) to provide a second signal to the output node, wherein the second signal is combined with the first signal such that the output current is determined by β·(N+1).

* * * * *

UNITED STATES PATENT AND TRADEMARK OFFICE

CERTIFICATE OF CORRECTION

PATENT NO. : 6,614,284 B1
DATED : September 2, 2003
INVENTOR(S) : Donald St. John Beeman et al.

It is certified that error appears in the above-identified patent and that said Letters Patent is hereby corrected as shown below:

Column 2,
Line 52, "corresp-onds to the sum" should read -- corresponds to the sum --

Column 3,
Line 22, "current source (133)" should read -- current source (I33) --
Lines 26 and 38, "Controlled current source 131" should read -- Controlled current source I31 --
Lines 32 "Controlled current source 131" should read -- Controlled current source I31 --
Line 43, "Controlled current source 133" should read -- Controlled current source I33 --
Line 49, "controlled current source 140" should read -- controlled current source I40 --
Line 53, "Current source 140" should read -- Current Source I40 --
Line 57, "Controlled current source 140" should read -- Controlled current source I40 --

Signed and Sealed this

Thirteenth Day of January, 2004

Jon W. Dudas

JON W. DUDAS
*Acting Director of the United States Patent and Trademark Office*